United States Patent Office 3,341,568
Patented Sept. 12, 1967

3,341,568
DICARBAMATES
George E. Ham, Lake Jackson, Tex., assignor to The Dow Chemical Company, Midland, Mich., a corporation of Delaware
No Drawing. Filed Sept. 5, 1963, Ser. No. 306,719
12 Claims. (Cl. 260—468)

This invention relates to new nitrogen-containing compositions of matter which are useful as bactericides and to methods of preparing such compositions. More particularly, the present invention relates to bactericidal compounds which contain two N-substituted alkyl carbamate groups per molecule linked by a divalent chain composed of carbon atoms and at least one nitrogen atom, and to the preparation of such compounds by the reaction of a primary amine and an alkyl aziridinylformate.

It is known that O-cyclohexyl-N,N-ethylene-urethane (cyclohexyl aziridinylformate) reacts slowly with aniline at room temperature to give O-cyclohexyl-N-(β-anilinoethyl)urethane, as disclosed by Iwakura et al. in J. Org. Chem. 25, 1118–1123 (1960). The compound N,N-bis (β-p-methylphenoxycarbonylamino)ethyl - p-phenetidine has also been prepared by the reaction of O-p-tolyl-N,N-ethyleneurethane and p-phenetidine, although neither O-ethyl-N,N-ethyleneurethane nor O-n-butyl-N,N-ethyleneurethane gave a reaction with aniline.

The reaction upon which the present invention is based is represented by the equation

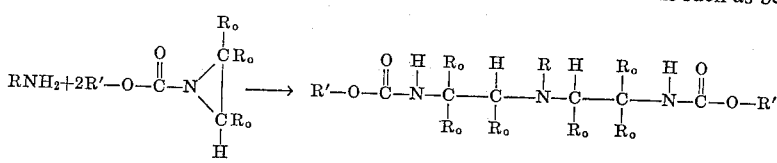

wherein each $R_o$ may be the same or different and is selected from the group consisting of the hydrogen atom and a lower alkyl group of 1–4 carbon atoms (preferably a hydrogen atom or a methyl group), R may be a hydrogen atom or may be a hydrocarbyl group which contains from 1 to 10 carbon atoms such as an alkyl, cycloalkyl or aralkyl group and R' (which may be the same or different) is an alkyl group of from 1 to 18 carbon atoms.

Suitable alkyl R and R' groups include methyl, ethyl, n-propyl, i-propyl, n-butyl, i-butyl, sec.-butyl, t-butyl, as well as n-pentyl, hexyl, heptyl, octyl, nonyl and decyl groups. In addition, R' may be an undecyl, dodecyl, tridecyl, tetradecyl, pentadecyl, cetyl, heptadecyl or octadecyl group. Other suitable R groups include cyclopentyl, cyclohexyl, methylcyclohexyl, cycloheptyl, benzyl, tolylethyl and phenylethyl groups. Unsymmetrical compounds (with different R' groups) are prepared by using two different alkyl aziridinylformates either sequentially or as a mixture (for example, methyl aziridinylformate, ethyl aziridinylformate and n-butylamine may be combined in an equimolar mixture to form ethyl-methyl [(n-butylimino) diethylene]dicarbamate).

Examples of compounds within the scope of the invention include:
diamyl[(methylimino)diethylene]-dicarbamate,
diethyl[(cyclopentylimino)diethylene]-dicarbamate,
ethyl-propyl[(cycloheptylimino)diethylene]-dicarbamate,
dioctadecyl[(phenylethylimino)diethylene]-dicarbamate,
diethyl[(benzylimino)di-i-propylene]-dicarbamate and
diethyl[(n-decylimino)diethylene]-dicarbamate.

The process of the invention may be carried out at any temperature of from 25° to 150° C. (preferably from about 70° to 90° C.) either with or without a suitable inert solvent. The reaction may be carried out at any pressure from a few hundredths of a millimeter of Hg to 100 atmospheres. The mole ratio of primary amine to aziridinyl compound may vary from 1:2 to about 5:1. When excessive amounts of amine are used, an extra separation step is generally required to separate the amine from the product formed. Amounts of reactants sufficient to provide an aziridinyl group for each hydrogen atom in the primary amine (i.e., stoichiometric amounts) should be employed for most economical operation. For example, good results are obtained by the reaction of ethylamine or n-propylamine and n-propyl aziridinylformate at temperatures of from 70° to 90° C. when the mole ratio of amine to aziridinyl compound is about 1:2.

Suitable solvents include acetonitrile, water, alkanols (especially secondary and tertiary alcohols) such as i-propanol, t-butanol, acetone, ether and inert hydrocarbons such as benzene, toluene or n-hexane.

All of the compounds of the invention contain three-nitrogen atoms (two secondary amide groups and one tertiary amine group) and in concentrated or dilute solutions inhibit or prevent the growth of *Aerobacter aerogenes*.

The following examples are submitted for the purpose of illustration only and are not to be construed as limiting the scope of the invention in any way.

*Example 1*

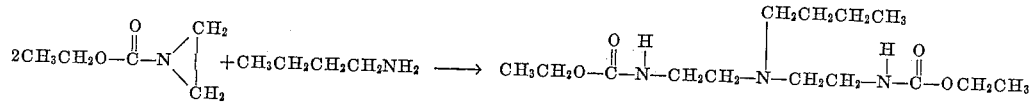

Into a reaction vessel equipped with a means for stirring, temperature control and refluxing were placed 23 grams (0.2 mole) of ethyl aziridinylformate, 14.6 grams (0.2 mole) of n-butylamine and 150 milliliters of dry acetonitrile. This mixture was refluxed for 6½ hours at 80° C. and the acetonitrile was removed under reduced pressure. The yield was 49.4 percent of diethyl-[(n-butyl-imino)diethylene]dicarbamate (about .05 mole) based on ethyl aziridinylformate. The fraction which would not distill below 150° C. at 0.5 millimeters of Hg was identified by infrared spectroscopy as the desired compound and was a colorless viscous liquid.

Neutralization equivalent: Found, 303. Calculated, 303.

The neutralization equivalents were determined by dissolving a known weight of compound in acetic acid and titrating the solution with p-toluenesulfonic acid in acetic acid (0.10 N) to the end point as determined with methyl violet indicator.

*Example 2*

Into a reaction vessel equipped with a means for stirring, temperature control and refluxing were placed 23 grams (0.2 mole) of ethyl aziridinylformate, 14.6 grams (0.2 mole) of isobutyl amine and 150 milliliters of dry acetonitrile. The mixture was refluxed for 6 hours at 80° C. and the acetonitrile was removed under reduced pressure. The yield was 49.2 percent based on ethyl aziridinylformate and the clear viscous product would not distill below 180° C. at 1.5 millimeters of Hg.

The infrared spectrum was consistent with that for diethyl[(i-butylimino)diethylene]dicarbamate.

Neutralization equivalent: Found, 304. Calculated, 303.

*Example 3*

Into a reaction vessel equipped with a means for stirring, temperature control and refluxing were placed 23 grams (0.2 mole) of ethyl aziridinylformate, 14.6 grams (0.2 mole) of tertiary butylamine and 150 milliliters of dry acetonitrile. The mixture was refluxed for 24 hours at 80° C. and the acetonitrile was removed under reduced pressure. The yield was 35.7 percent (based on ethyl aziridinylformate) of a clear viscous liquid boiling at greater than 180° C. at 0.5 millimeter of Hg.

The infrared spectrum was consistent with that for diethyl[(t-butylimino)diethylene]dicarbamate.

Neutralization equivalent: Found, 302. Calculated, 303.

*Example 4*

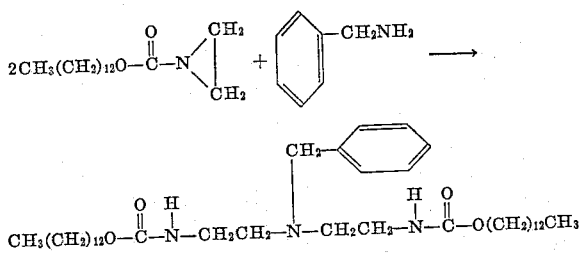

Into a reaction vessel equipped with a means for stirring, temperature control and refluxing were placed 53.89 grams (0.2 mole) of tridecyl aziridinylformate, 10.72 grams (0.1 mole) of benzylamine and 50 milliliters of dry acetonitrile. The mixture was refluxed for three days at 85° C. and the acetonitrile was removed under reduced pressure. A 97.2 percent yield based on tridecyl aziridinylformate was obtained.

The infrared spectrum was consistent with that for di(tridecyl)[(benzylimino)diethylene]dicarbamate.

Neutralization equivalent: Found, 639. Calculated, 646.

*Example 5*

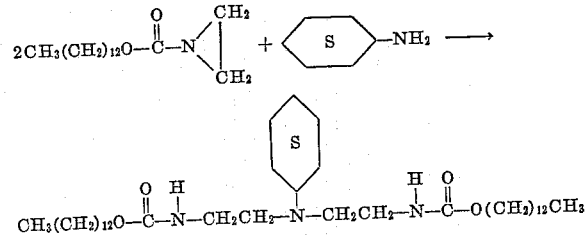

("S" means that the ring is saturated, i.e., a cyclohexyl group.)

Into a reaction vessel equipped with a means for stirring, temperature control and refluxing were placed 53.89 grams (0.2 mole) of tridecyl aziridinylformate, 9.92 grams (0.1 mole) of cyclohexylamine and 50 milliliters of acetonitrile. The mixture was refluxed for three days at 85° C. and the acetonitrile was removed under reduced pressure. The yield was 97.3 percent based on tridecyl aziridinylformate of a clear viscous liquid.

The infrared spectrum was consistent with that for di(tridecyl)[(cyclohexylimino)diethylene]dicarbamate.

Neutralization equivalent: Found, 634. Calculated, 638.

*Example 6*

Petri dishes containing nutrient agar were streaked with *Aerobacter aerogenes*. The compounds from Examples 1 through 5 were cross-streaked into the agar-containing Petri dishes. Growth was observed for 72 hours at 25° C. No growth was observed at the intersection of the test compounds and the *Aerobacter aerogenes*. In all other areas, growth was abundant.

I claim as my invention:

1. A compound of the formula

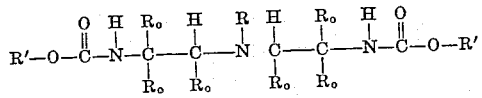

wherein
  each $R_o$ is independently selected from the group consisting of the hydrogen atom and a lower alkyl group,
  R is selected from the group consisting of the hydrogen atom and a hydrocarbon group of from 1 to 10 carbon atoms selected from the group consisting of alkyl, cycloalkyl and aralkyl groups, and each R′ is an alkyl group of from 1 to 18 carbon atoms.

2. A compound according to claim 1 wherein R′ is an ethyl group.

3. A compound according to claim 1 wherein R′ is a tridecyl group.

4. The compound diethyl[(n-butylimino)-diethylene]dicarbamate.

5. The compound diethyl[(i-butylimino)-diethylene]dicarbamate.

6. The compound diethyl[(t-butylimino)-diethylene]dicarbamate.

7. The compound di(tridecyl)[(benzylimino)-diethylene]dicarbamate.

8. The compound di(tridecyl)[(cyclohexylimino)diethylene]dicarbamate.

9. A process for the preparation of a dicarbamate which comprises reacting:
  (a) a primary amine of the formula $$RNH_2$$

wherein R is a hydrocarbon group of from 1 to 10 carbon atoms selected from the group consisting of alkyl, cycloalkyl and aralkyl radicals, and
  (b) an alkyl aziridinylformate of the formula

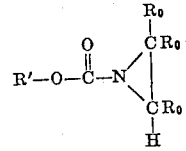

wherein R′ is an alkyl group of from 1 to 18 carbon atoms and each $R_o$ is independently selected from the group consisting of the hydrogen atom and a lower alkyl group.

10. The process of claim 9 wherein the reaction is carried out in an inert solvent at temperatures of from 25° to 150° C.

11. The process of claim 9 wherein the mole ratio of compound (a) to compound (b) is from 1:2 to about 5:1.

12. The process of claim 9 wherein acetonitrile is employed as a solvent.

References Cited

FOREIGN PATENTS 904,014   2/1945   France.
925,495   3/1955   Germany.
67,192   12/1943   Norway.

OTHER REFERENCES

Iwakura et al., J. Org. Chem., vol. 25 (1960) pp. 1118–1123.

Coleman et al., J. Am. Chem. Soc., vol. 68 (1946) pp. 2006–2007.

LORRAINE A. WEINBERGER, *Primary Examiner.*

RICHARD K. JACKSON, *Examiner.*